United States Patent
Noui-Mehidi et al.

(10) Patent No.: US 10,429,533 B2
(45) Date of Patent: *Oct. 1, 2019

(54) ELECTRICAL SUBMERSIBLE PUMP MONITORING AND FAILURE PREDICTION

(71) Applicant: Saudi Arabian Oil Company, Dhahran (SA)

(72) Inventors: Mohamed Nabil Noui-Mehidi, Dhahran (SA); Ahmed Yasin Bukhamseen, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/257,609

(22) Filed: Jan. 25, 2019

(65) Prior Publication Data

US 2019/0154862 A1  May 23, 2019

Related U.S. Application Data

(63) Continuation of application No. 13/712,444, filed on Dec. 12, 2012, now Pat. No. 10,288,760.

(60) Provisional application No. 61/570,030, filed on Dec. 13, 2011.

(51) Int. Cl.
| | |
|---|---|
| *G01V 3/06* | (2006.01) |
| *E21B 47/00* | (2012.01) |
| *G01V 3/38* | (2006.01) |
| *H02P 31/00* | (2006.01) |

(52) U.S. Cl.
CPC ............ *G01V 3/06* (2013.01); *E21B 47/0007* (2013.01); *G01V 3/38* (2013.01); *H02P 31/00* (2013.01)

(58) Field of Classification Search
None
See application file for complete search history.

(56) References Cited

U.S. PATENT DOCUMENTS

| | | |
|---|---|---|
| 3,936,231 A | 2/1976 | Douglas |
| 5,629,870 A | 5/1997 | Farag et al. |
| 5,634,522 A | 6/1997 | Hershberger |
| 5,815,413 A | 9/1998 | Hively et al. |
| 6,167,965 B1 | 1/2001 | Bearden |
| 6,192,325 B1 | 2/2001 | Piety et al. |
| 6,260,004 B1 | 7/2001 | Hays |
| 6,326,758 B1 | 12/2001 | Discenzo |
| 6,640,196 B1 | 10/2003 | Unsworth et al. |

(Continued)

FOREIGN PATENT DOCUMENTS

| | | |
|---|---|---|
| EP | 1770853 A2 | 4/2007 |
| WO | 2011051782 A2 | 5/2011 |

OTHER PUBLICATIONS

European Office Action dated Jul. 9, 2018 for corresponding European patent application No. 12812449.2 (SA785EP); pp. 1-4.

(Continued)

*Primary Examiner* — Andrew Schechter
*Assistant Examiner* — Lina M Cordero
(74) *Attorney, Agent, or Firm* — Bracewell LLP; Constance G. Rhebergen; Christopher L. Drymalla

(57) ABSTRACT

Current supplied to electrical submersible pumps in wells is monitored, and signal processing based on wavelet analysis and phase diagram analysis is performed on the data obtained from monitoring. An incipient malfunction of the electrical submersible pump, such as one due to scale build-up in and around the pump, can be detected at an early stage.

7 Claims, 4 Drawing Sheets

(56) References Cited

U.S. PATENT DOCUMENTS

| | | |
|---|---|---|
| 6,709,240 B1 | 3/2004 | Schmalz et al. |
| 6,727,725 B2 | 4/2004 | Devaney et al. |
| 6,757,665 B1 | 6/2004 | Unsworth et al. |
| 6,941,785 B2 | 9/2005 | Haynes et al. |
| 7,013,223 B1 | 3/2006 | Zhang et al. |
| 7,209,861 B2 | 4/2007 | Hively |
| 7,301,296 B1 | 11/2007 | Discenzo |
| 7,308,322 B1 | 12/2007 | Discenzo et al. |
| 7,336,455 B2 | 2/2008 | Dimino et al. |
| 7,949,483 B2 | 5/2011 | Discenzo et al. |
| 8,416,086 B2 | 4/2013 | Hively |
| 8,849,580 B2 | 9/2014 | Kauffman et al. |
| 2002/0186039 A1 | 12/2002 | Devaney et al. |
| 2003/0086341 A1 | 5/2003 | Wells et al. |
| 2004/0090197 A1 | 5/2004 | Schuchmann |
| 2004/0117132 A1 | 6/2004 | Stephenson |
| 2004/0230384 A1 | 11/2004 | Haynes et al. |
| 2004/0267395 A1 | 12/2004 | Discenzo et al. |
| 2005/0001623 A1 | 1/2005 | Hanstein |
| 2005/0021302 A1 | 1/2005 | Dimino et al. |
| 2006/0082252 A1 | 4/2006 | Allmendinger et al. |
| 2007/0112521 A1 | 5/2007 | Akimov |
| 2007/0252717 A1 | 11/2007 | Fielder |
| 2008/0010020 A1 | 1/2008 | Ellender |
| 2008/0187444 A1 | 8/2008 | Molotkov et al. |
| 2008/0270328 A1 | 10/2008 | Lafferty et al. |
| 2009/0044938 A1 | 2/2009 | Crossley et al. |
| 2009/0150323 A1 | 6/2009 | Hively |
| 2009/0204234 A1 | 8/2009 | Sustaeta et al. |
| 2009/0211764 A1 | 8/2009 | Fielding et al. |
| 2009/0222228 A1 | 9/2009 | Gao et al. |
| 2010/0101785 A1 | 4/2010 | Khvoshchev et al. |
| 2010/0155057 A1 | 6/2010 | Atherton |
| 2010/0166570 A1 | 7/2010 | Hampton |
| 2011/0050144 A1 | 3/2011 | Knox et al. |
| 2011/0234421 A1 | 9/2011 | Smith |

OTHER PUBLICATIONS

Fraser, Andrew M. et al.; "Independent coordinates for strange attractors from mutual information" Physical Review A, vol. 33, No. 2, Feb. 1986, pp. 1134-1140.

Haapanen, B.E. et al.; "Remote Monitoring and Optimization of Electrical Submersible Pumps Utilizing Control Algorithms" CSUG/SPE 134109, Canadian Unconventional Resources & Int'l Petroleum Conference, Oct. 19-21, 2010; pp. 1-14.

International Search Report and Written Opinion for International Application No. PCT/US2012/069224 (SA785PCT), dated Nov. 14, 2013. (pp. 1-8).

Lea, James F. et al.; "ESP's: On and Offshore Problems and Solutions" SPE 52159, SPE Mid-Continent Operations Symposium, Mar. 28-31, 1999, pp. 1-23.

Macary, S. et al. "Downhole Permanent Monitoring Tackles Problematic Electrical Submersible Pumping Wells" SPE 84138, SPE Annual Technical Conference and Exhibition, Oct. 5-8, 2003, pp. 1-8.

Merdhah, Amer Badr Bin et al.; "Scale Formation Due to Water Injection in Malaysian Sandstone Cores" American Journal of Applied Sciences, vol. 6, No. 8, 2009, pp. 1531-1538.

Merdhah, Amer Badr Bin et al.; "Study of Scale Formation in Oil Reservoir During Water Injection—A review" Marine Science & Technology Seminar, Feb. 22-23, 2007, pp. 1-7.

ELECTRICAL SUBMERSIBLE PUMP MONITORING AND FAILURE PREDICTION

CROSS REFERENCE TO RELATED APPLICATIONS

This application is a continuation of U.S. Non-Provisional application Ser. No. 13/712,444, filed Dec. 12, 2012, which claims priority to U.S. Provisional Application No. 61/570,030, filed Dec. 13, 2011, each of which is hereby incorporated by reference in its entirety.

BACKGROUND OF THE INVENTION

1. Field of the Invention

The present invention relates to monitoring performance and to failure prediction of electrical submersible pumps in wells.

2. Description of the Related Art

Submersible pumps have been used in wells for oil production at various depths and flow rates. The pumps are typically electrically powered and referred to as Electrical Submersible Pumps (ESP's). ESP's were one of several forms of what is known as artificial lift. ESP's were located in tubing in the well and provided a relatively efficient form of production.

An ESP system used in oil production included surface components at the production wellhead or platform and subsurface components located in production tubing or casing at the level of producing formations in the well. Surface components included a motor controller and surface cables and transformers for power transfer to the subsurface components downhole. Subsurface components in the well included a pump, pump motor, fluid seals and power supply cables.

The downhole ESP pumps were immersed in the well fluids being pumped for production at the operating depths in the well and drove formation fluids to the surface with power supplied from the electrically powered pump motor which received operating power from the surface over the power supply cables.

During production from the formation, mineral deposits from the formation fluid occurred in and around the ESP's, well tubing and other subsurface equipment, and have caused recurrent problems. The mineral deposits were known as scale. One of the common failure reasons in ESP assemblies resulted from scale build-up in the pump stages, where scale gradually formed around the impeller vanes and eventually blocked fluid flow. Scale deposits led to a gradual decrease of the pump efficiency until pump failure eventually occurred.

Problems with scale and other subsurface conditions as well as extended service eventually led to failure of the downhole ESP components, usually the pump. The causes and reasons of ESP component failure were usually analyzed after the system had been pulled out or extracted from the well. The analysis commonly used after the ESP had been removed from the well was a detailed DIFA (Dismantle Inspection & Failure Analysis) process where each component of the ESP assembly was carefully analyzed for an understanding of the nature of the failure. Experience has shown that generally more than 20% of failure causes were attributed to motor failure.

As noted, however, this form of failure analysis could only be performed after the failure occurred, and after the downhole or subsurface ESP components had been extracted from the well. Both the ESP failure and its removal from the well caused production from the well to be stopped. Production from the well was only resumed when a replacement ESP subsurface system could be installed in the well. Production from the well was thus interrupted for the time required for scheduling a workover rig and its transport to the well, in addition to the time for installation of a replacement ESP subsurface system.

SUMMARY OF THE INVENTION

Briefly, the present invention provides a new and improved apparatus for monitoring performance of an electrical submersible pump in a well based on analysis of pump electrical current. The apparatus according to the present invention includes an analyzer of the frequency spectrum of the energy in the pump electrical current, and a wavelet analyzer of the waveform of the pump electrical current identifying time variations of the pump electrical current. The apparatus also includes an analyzer of the pump electrical current to identify dynamic behavior of the pump during pumping, and a phase space analyzer forming a measure of the identified dynamic behavior of the pump based on fluctuations in the pump electrical current. A graphical interface of the apparatus forms indications from the analyzers for monitoring performance of the pump to detect disturbances in performance of the pump.

The present invention also provides a new and improved method of monitoring performance of an electrical submersible pump in a well based on analysis of pump electrical current. The frequency spectrum of the energy in the pump electrical current is analyzed, and the waveform of the pump electrical current is analyzed to identify time variations of the pump electrical current. The pump electrical current is analyzed to identify dynamic behavior of the pump during pumping, and a measure of the identified dynamic behavior of the pump is formed based on fluctuations in the pump electrical current. Indications of the results of the analysis are formed for monitoring performance of the pump to detect disturbances in performance of the pump.

DETAILED DESCRIPTION OF THE PREFERRED EMBODIMENTS

Figure 1:
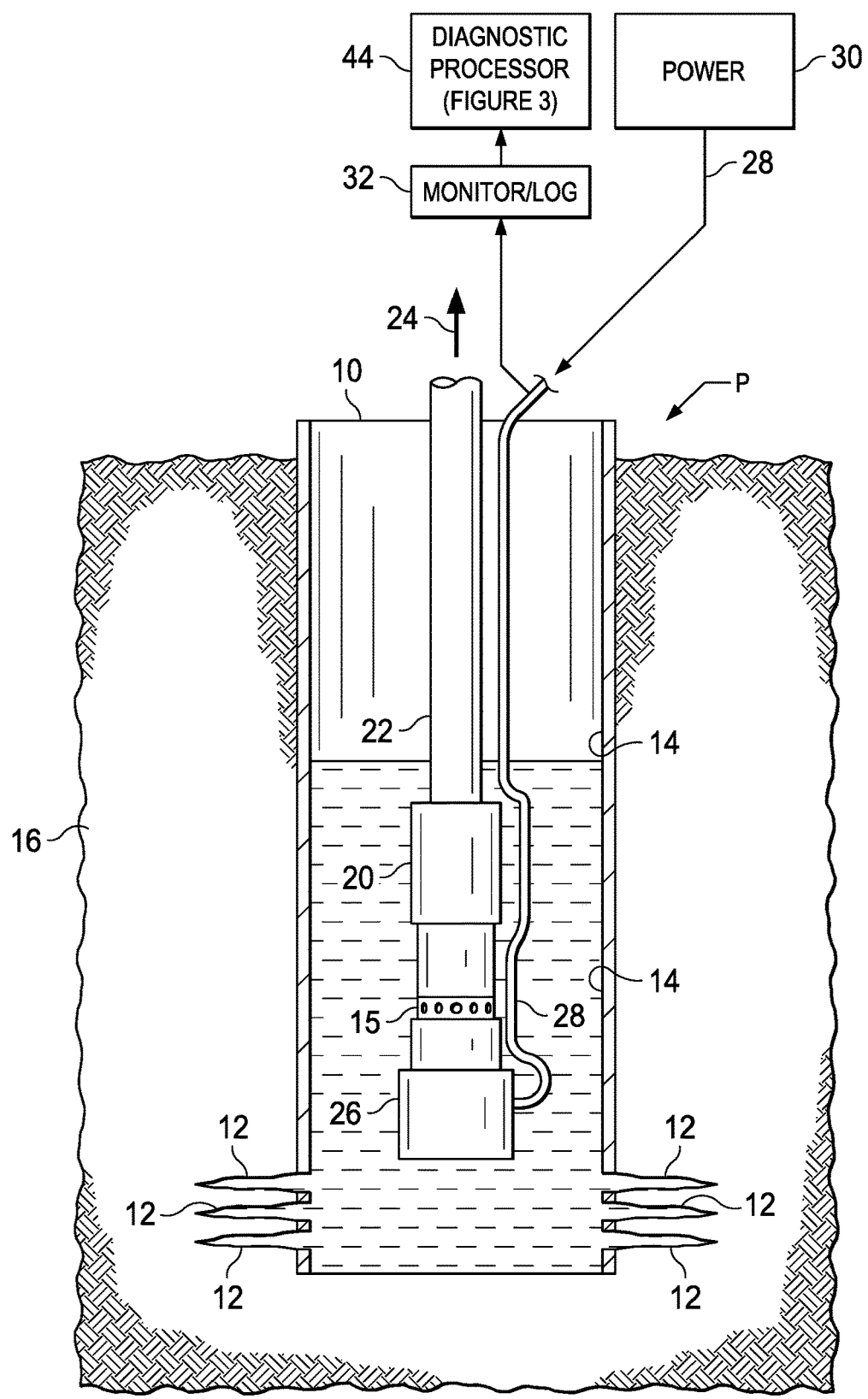
FIG. 1 is a schematic diagram of an electrical submersible pump in a well.

Referring to FIG. 1, an electrical submersible pump assembly P is shown in a well 10 at the location of a number of perforations 12 formed in a casing 14 to allow entry through an inlet or intake section 15 of oil and other hydrocarbon fluids from a formation 16 in a subsurface reservoir. The casing 14 may also be a liner installed within larger diameter casing in the well 10. A pump section 20 of the electrical submersible pump assembly P is immersed in the fluids in the casing 14. The electrical submersible pump assembly P is suspended within the casing 14 on tubing 22 at the well depth of the perforations 12 so that the pump section 20 may drive or pump fluids in the casing 14 as indicated at 24 to a collection facility at the surface.

The pump section 20 includes a suitable number of centrifugal pump stages which are driven by an alternating current pump motor 26. The pump motor 26 receives operating electrical power over a cable 28 from a suitable power source 30 at the surface. The pump motor 26 drives a shaft that extends through suitable sealing for driving the centrifugal pump stages of pump section 20 of the electrical submersible pump assembly P. The pump section 20 is conventional and comprises a large number of stages of impellers and diffusers.

The electrical submersible pump assembly P of FIG. 1 is equipped with a monitoring or logging system 32 to continuously record different operating parameters regarding the electrical submersible pump assembly P to ensure the good functionality of both pumping system and associated sensors. As part of the control and monitoring protocols of the electrical submersible pump assembly P, the current waveform of the operating power provided to the pump motor 26 over the cable 28 is continuously recorded along with other operating parameters, such as the fluid rates, the pump speed, intake and discharge pressures.

Figure 2:
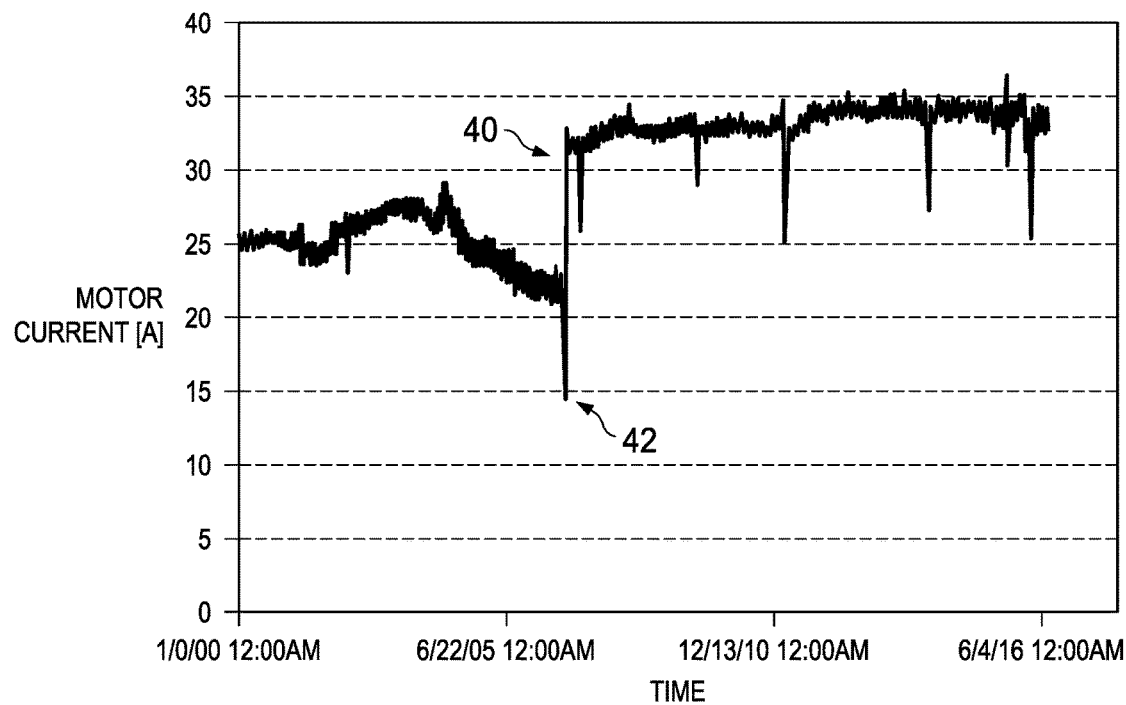
FIG. 2 is an plot of an example log over time of motor current to an electrical submersible pump.

An example pump electrical current log of current amplitude as a function of time is shown at waveform 40 in FIG. 2. The current log waveform 40 illustrates an example of an ESP motor current over a period of several weeks before a pump assembly failure as indicated at 42. It can be noticed from FIG. 2 that for a period of time of several days before the failure, the pump current waveform 40 shows a substantial variation in pump performance trends.

Figure 3:
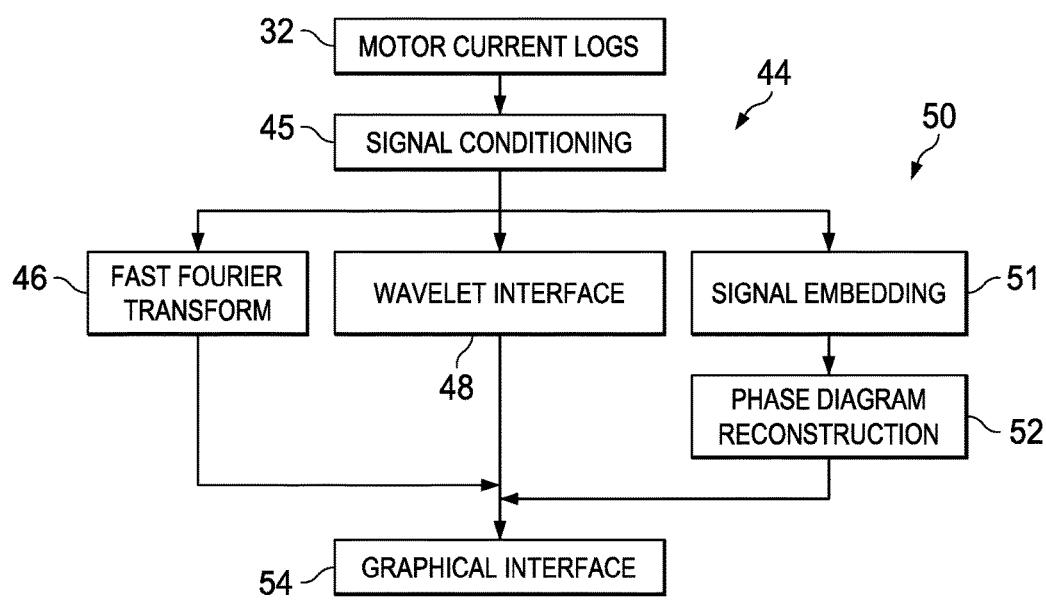
FIG. 3 is a schematic diagram of diagnostic signal processing components according to the present invention for an electrical submersible pump.

According to the present invention, a diagnostic processor 44 (FIG. 3) performs advanced signal analysis of pump motor operations to monitor for the likely occurrence of a pump motor failure due to scale build-up. The signal analysis may be either as a computer-implemented method on a general purpose computer, or may be specifically configured digital signal processing circuitry or chips, or a combination of the two. The diagnostic processor 44 processes the pump electrical current signal logs received from the logging system 32 after conditioning and conversion to a format for digital processing by a conditioning circuit 45 (FIG. 3). The diagnostic processor 44 analyzes the pump electrical current logs to identify the dynamical behavior and performance of the pump motor 26 (FIG. 1).

In accordance with the present invention, the diagnostic processor 44 includes modules to analyze several aspects of variations recorded in the motor current signals by logging system 32 to dynamically follow the pump operation and indicate events which indicate a likely occurrence of failure of the pump motor in advance of the actual failure. Time series of the motor current signals collected by the logging system 32 are analyzed by Fourier transform analyzer module 46, a wavelet transform module 48 and phase attractor module 50, as shown in FIG. 3.

The Fourier transform analyzer module 46 is a processor which operates either as a programmed digital signal processor or special purpose processing circuitry to analyze the pump current signal waveform by Fourier analysis. The Fourier transform analyzer module 46 provide measures of the power or energy present in the pump electrical current as a function of frequency over its frequency spectrum. The Fourier transform analyzer module 46 provides an indication of signal properties in a defined time window for the pump electrical current waveform. Fourier analysis by the analyzer module 46 yields an energy density in individual frequency ranges of the power spectrum. The Fourier transform analyzer module 46 in the preferred embodiment preferably performs a signal processing technique known as a Fast Fourier Transform. The power spectrum obtained by a Fast Fourier Transform analysis allows determination of the range of frequencies present in the pump electrical current in the pump assembly P at times prior to a pump failure and identifies characteristic frequencies of pump electrical current when present.

Figure 4A:
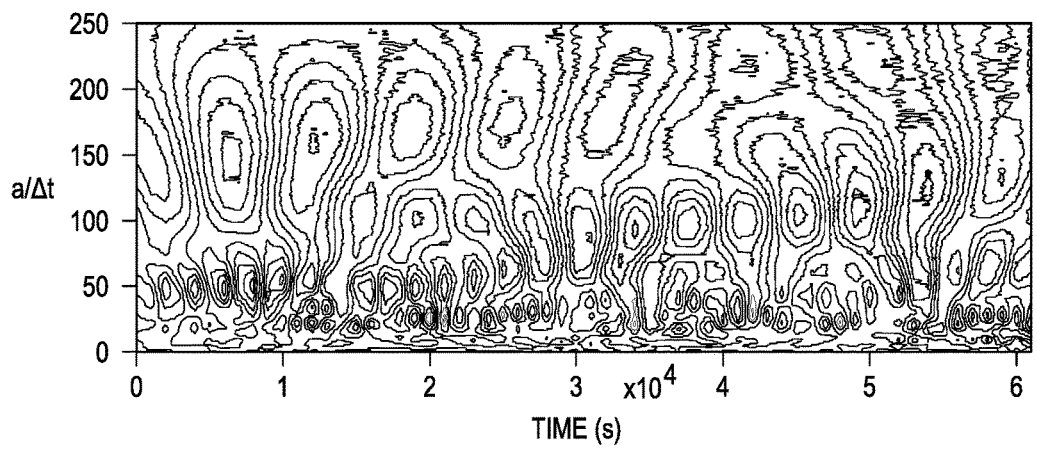
FIG. 4A is a plot of example Fourier Transform plots from motor current logs for an electrical submersible pump.

FIG. 4A presents an example of the Fourier transform plots obtained from the module 46. In actual practice, plots like that of FIG. 4A are in color to indicate in more detail, the data of interest. The Fourier transform plot of FIG. 4A shows the characteristic frequencies of the motor current logs and exhibits amplitude peaks dominating the frequency spectrum indicating a singular structure in the signal corresponding to the scale build-up as an additional load on the ESP motor shaft.

The wavelet transform analyzer module 48 (FIG. 3) performs a wavelet analysis of the pump electrical current logs provided by the logging system 32. The wavelet transform analyzer module 48 may also be a processor which operates either as a programmed digital signal processor or special purpose processing circuitry to analyze the pump current signal waveform by wavelet transform analysis.

The wavelet transform analyzer module 48 is a module determines signal characteristic variations of the pump electrical current waveform in the time domain, while the Fourier analyzer module 46, as set forth above, analyzes signal characteristic variations of the pump electrical current waveform in the frequency domain. Wavelet analysis by the wavelet transform analyzer module 48 permits the tracking of the spatio-temporal evolution of the signal in various time scales.

The wavelet transform of a continuous signal s(t) representing the pump electrical current as a function time t is given by:

$$C(\tau, a) = \frac{1}{\sqrt{a}} \int_{-\infty}^{+\infty} \psi\left(\frac{t-\tau}{a}\right) s(t) dt \qquad (1)$$

where $\psi$ is a mother wavelet, which is an absolutely integrable function.

Wavelet analysis in module 48 is performed by the dilatation and translation of the mother wavelet $\psi$. The parameter a in Equation (1) is related to the dilatation and is inversely proportional to frequency. Varying the parameter a for wavelet analysis in analyzer 48 changes the center frequency of the mother wavelet $\psi$ and also the wavelet time parameter. The parameter a is thus used rather than frequency to represent the results of wavelet analysis in wavelet analyzer 48, as will be seen.

The parameter $\tau$ is the translation or time-shift parameter. The parameter $\tau$ specifies the location of the wavelet in time, and adjustment of the parameter $\tau$ causes the wavelet to shift over the pump electrical current signal being analyzed. For instance, a wavelet known as the 'Mexican hat function' given by:

$$\psi(t) = (1 - t^2)\exp\left(-\frac{t^2}{2}\right) \qquad (2)$$

may, for example, be chosen as the mother wavelet when the signal s(t) has high fluctuations. In the wavelet analyzer 48, a compression of the parameter a being varied to a lower value allows analysis of high frequency components of the electrical pump current waveform, while stretching of the parameter a to an increased value is related to low frequency components.

Figure 4B:
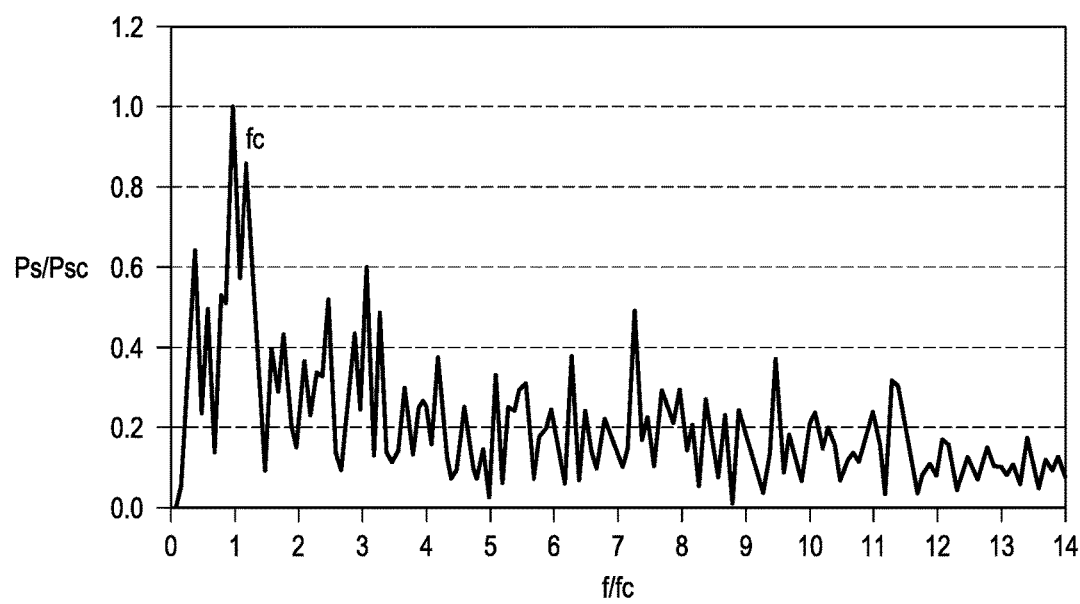
FIG. 4B is a plot of example wavelet current plots from motor current logs for an electrical submersible pump.

FIG. 4B is an example plot of the wavelet transform output formed by the wavelet analyzer module 48 as function of time-scale diagrams of iso-correlation contours a/Δt of the parameter a for the parameter a for different time shifts plotted in different frequency levels.

In the example of wavelet transform plot shown in FIG. 4B the iso-correlation contour plots are normalized against the highest correlation value to highlight the peak of the correlation values. The centers of contour zones corresponding to peak values clearly show periodic structures appearing at different time scales. This periodicity in the peak alignments against the time scale exhibits the presence of a regular structure in the signal corresponding to an anomaly in the signal pattern due to the scale build-up in the system resulting from additional load or torque on the ESP shaft. It can be seen also that these peaks have different a/Δt values indicating a progression in the dynamical behavior of the system, meaning progression of the scale load on the rotating shaft.

Figure 5:
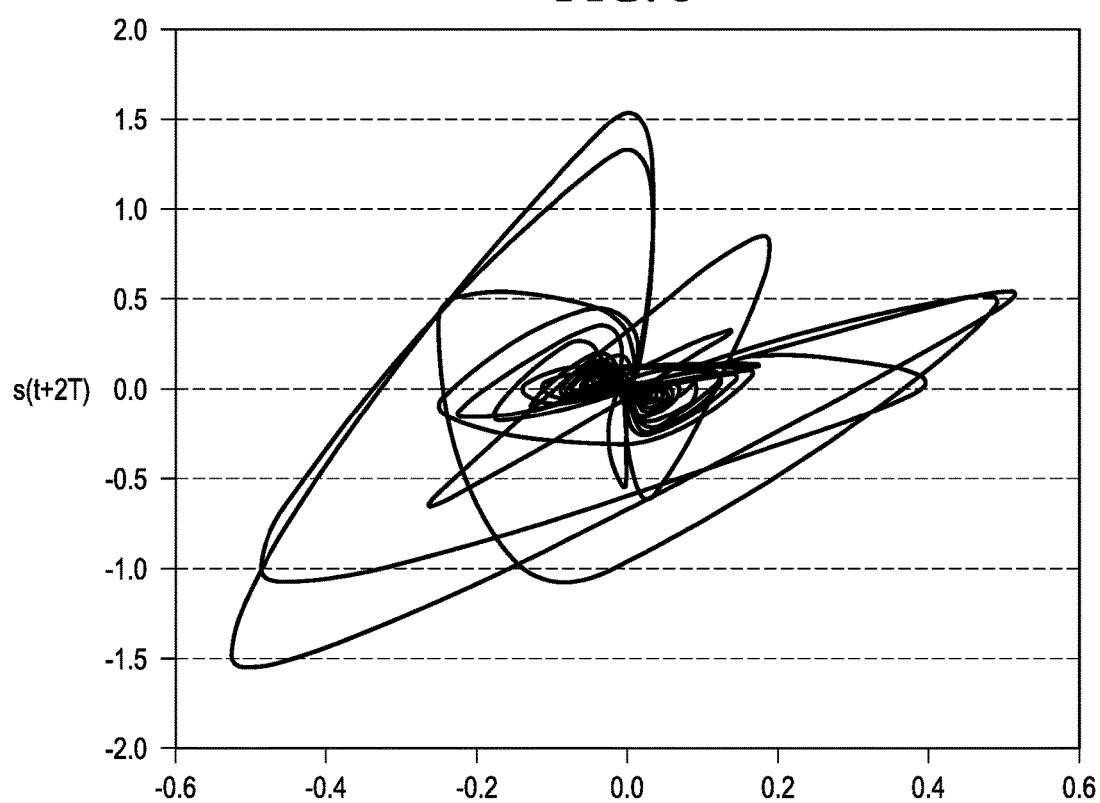
FIG. 5 is an example phase space diagram obtained from processing according to the present invention.

The diagnostic processor 44 also includes a dynamic behavior analyzer module 50 in which a time series signal corresponding to a certain flow regime of fluid through the pump assembly P is dynamically embedded in order to determine the signal fractal dimensions that are used to build the dynamical attractor described in FIG. 5. Based on data from the motor current log obtained by the monitor 32, pump performance changes can be identified. The pump electrical current waveform is marked in behavior analyzer module 50 by the superimposition in a module 51 of several characteristic frequencies added in time. The presence of the added time series signals allows, after return to steady state, the signal identification of a resultant associated attractor indicating pump performance. For example, the signal processing method of method of mutual information can be used to estimate the time delay of each time series recorded to construct an attractor associated with each introduced time delay. The appropriate time delay is the one which corresponds to the first minimum value of the mutual information function calculated from the time series.

The diagnostic processor 44 also includes a phase diagram reconstruction module 52, in which the dynamical behavior of the pump as indicated by measurements furnished by monitor 32 is determined from the embedded signals by reconstruction of phase diagrams. The signal embedding module 51 and the phase diagram reconstruction module 52 may each also be a processor which operates either as a programmed digital signal processor or special purpose processing circuitry to identify dynamic behavior of the pump assembly P.

An example display of a reconstructed phase diagram formed by the module 52 is shown in FIG. 5. Analysis of such data as that of FIG. 5 collected from the motor current logs has shown that the fluctuations recorded had very low frequencies, which are repesentative of the gradual build-up of the scale in the different pump stages. The phase space reconstruction plot shown in FIG. 5 constructed from the signal recorded indicates a clearly typical chaotic tendency of the current logs shortly before pump failure. The plot in FIG. 5 exhibits clearly a typical attractor basin that reveals from dynamical definitions the existence of a regular structure in the signal linked to the additional load on the ESP motor shaft resulting from the gradual scale build-up. The combined plots from FIGS. 4A, 4B, and 5 clearly highlight the changes in the ESP motor current trends and dynamically indicate the existence of an additional load on the motor shaft as the scale builds up in the different ESP stages.

The diagnostic processor 44 includes graphical interface 54 which receives processed data from each of the Fourier analyzer module 46, the wavelet analyzer module 48 and the phase diagram reconstruction module 52 to form displays of the processed pump electrical current data. The graphical interface 54 forms displays of frequency spectra obtained form the Fourier analyzer module 46 as shown in FIG. 4A. The graphical interface 54 also forms displays such as those shown in FIG. 4B based on processing results from the wavelet analyzer 48 and phase space reconstruction diagrams shown in FIG. 5 based on processing results from the phase space diagram reconstruction module 52. The graphical interface is a user frendly environment that allows the user to display the plots desired from the above-mentioned methods and follow the evolution of the raw signal as well.

The graphical interface 54 provides as separate outputs the results formed in the diagnostic processor 44 as separate displays or windows. The analysis from the three displays provides indications to show any disturbance present in the pump motor current logs and also provides advance indications of pump performance or behavior likely to result in pump failure. The diagnostic processor 44 allows monitoring the growth of the scale on the electrical submersible pump assembly P by identifying the magnitude of the disturbances in the motor current logs.

Diagnostic processing according to the present invention continuously monitors the performance of the electrical submersible pump assembly P and predicts potential failure due to scale build-up. From motor current recorded prior to the failure, weak fluctuations in such current can be recorded, indicating a change in the motor load due to the scale build-up on the pump motor shaft. This scale build-up affects localized shaft torque and therefore the total motor power draw. These changes can be identified through the motor current draw. The advanced signal analysis of the motor current data provided with the present invention can reveal the presence of a dynamical character changes of the pump current signal when scale starts rapidly building up in the pump stages.

Accordingly, the present invention provides a real time diagnostic system that predicts the likelihood of failure of an ESP system several days or weeks before the actual event of failure. This leads to better control of the well production protocol. For instance, if failure due to scale build-up is predicted through the diagnostic tools provided with the present invention, several actions can be planned to prevent or delay the pump failure. Such actions include, for example, reducing the motor speed to increase the production periods even at lower volumes. Thus, production may continue while a work-over rig is being scheduled for replacement of the electrical submersible pump assembly, or while planning for an acidizing job to remove the scale. Such actions could result in avoidance of costly work-overs and minimizing lost production due to downtime.

The present invention thus identifies in real time disturbances in the performance of the electrical submersible pump assembly. Detection can occur at the very early stages of a pump motor malfunction resulting from change in the power draw due to scale build-up in the pump stages. Pro-active control of the pump run time can thus take place and remedial action planned to prevent total pump failure. The present invention also minimizes down time for pump repair in particular.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the processing methodology, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A method of monitoring and operating an electrical submersible pump motor disposed in a hydrocarbon well in situ to prolong operation of the pump motor and pumping of well fluids based on behavior and performance of the pump motor during pumping of the well fluids identified from an analysis of a pump motor electrical current providing operating electrical power to the pump motor, the method comprising:

recording, by a logging system, pump motor electrical current logs of the operating electrical power provided by the pump motor electrical current to the pump motor during pumping of the well fluids;

receiving, by a conditioning circuit, the pump motor electrical current logs and converting the pump motor electrical current logs to a format for processing;

receiving, by a frequency spectrum analyzer, the pump motor electrical current logs from the conditioning circuit and providing measures of energy density present during pumping of the well fluids in individual frequency ranges of a frequency spectrum of the pump motor electrical current;

receiving, by a wavelet analyzer, the pump motor electrical current logs from the conditioning circuit and providing measures of variations in signal time shift and frequency characteristics of the pump motor electrical current during pumping of the well fluids to identify variations of the pump motor dynamic behavior as functions of time, and applying, by the wavelet analyzer, an adjustable wavelet to a pump motor electrical current waveform to identify additional load on the pump motor during pumping of the well fluids;

receiving, by a signal embedding module of a dynamic behavior analyzer module, the pump motor electrical current logs from the conditioning circuit and superimposing a set of added time series signals of different characteristic frequencies into the pump motor electrical current logs to identify dynamic behavior performance changes of the pump motor during pumping of the well fluids from changes in the pump motor electrical current logs; and receiving, by a phase diagram reconstruction module comprising an analyzer of the dynamic behavior analyzer module, the pump motor electrical current logs with the superimposed time series signals from the signal embedding module, the phase diagram reconstruction module sampling the received pump motor electrical current logs with the superimposed time series signals at different time intervals and forming a measure of the identified dynamic behavior performance changes of the pump motor based on fluctuations in the pump motor electrical current during pumping of the well fluids;

display, by way of a graphical display interface, pump motor diagnostic information for monitoring the behavior and performance of the pump motor to detect disturbances in performance of the pump motor during pumping of the well fluids, the pump motor diagnostic information comprising:
  (a) characteristic frequencies and amplitude peaks as a function of frequency in the frequency spectrum of the pump motor electrical current measures provided by the frequency spectrum analyzer;
  (b) variations of signal time shift and frequency characteristics of the pump motor electrical current identifying variations of the pump motor dynamic behavior from the measures provided by the wavelet analyzer; and
  (c) phase diagrams of the dynamic behavior performance changes of the pump motor from the phase diagram reconstruction module;

predicting, based on the pump motor diagnostic information, a failure of the pump motor; and reducing, in response to predicting the failure of the pump motor, an operating speed of the pump motor.

2. The method of claim 1, wherein the frequency spectrum analyzer comprises a Fast Fourier Transform analyzer.

3. The method of claim 1, further comprising the dynamic behavior analyzer module forming an identification of attractors based on the dynamic behavior of the pump motor.

4. The method of claim 3, further comprising the phase diagram reconstruction module forming an indication in a phase space diagram of the identified attractors furnished by the dynamic behavior analyzer module.

5. The method of claim 1, further comprising the wavelet analyzer applying the adjustable wavelet to the pump motor electrical current waveform and performing dilation and translation of the applied wavelet to identify variations in the pump motor electrical current.

6. The method of claim 1, wherein the additional load on the pump motor comprises scale build-up on a pump.

7. The method of claim 1, wherein the dynamic performance changes of the pump motor are pump motor electrical current fluctuations at low frequencies representative of gradual scale build-up in a pump.

* * * * *